United States Patent
Shahidi et al.

(10) Patent No.: US 8,068,959 B2
(45) Date of Patent: Nov. 29, 2011

(54) VEHICLE DOOR ACTIVE AND PASSIVE CONTROL DEVICE

(75) Inventors: Bijan K. Shahidi, Novi, MI (US); XianLi Huang, Northville, MI (US); Zhen Steven Zhang, Canton, MI (US); Jason C. S. Tien, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1044 days.

(21) Appl. No.: 11/834,975

(22) Filed: Aug. 7, 2007

(65) Prior Publication Data

US 2009/0043456 A1    Feb. 12, 2009

(51) Int. Cl.
*B60J 10/08* (2006.01)
(52) U.S. Cl. ......... 701/49; 701/36; 296/1.03; 296/146.9
(58) Field of Classification Search ............ 701/36, 701/49; 296/1.03, 146.1, 146.9, 207; 335/285, 335/295; 292/251.5
See application file for complete search history.

(56) References Cited

U.S. PATENT DOCUMENTS

| | | | |
|---|---|---|---|
| 3,427,832 A * | 2/1969 | Planer | 70/264 |
| 4,530,185 A | 7/1985 | Moriya et al. | |
| 4,579,192 A | 4/1986 | Mueller | |
| 5,170,530 A | 12/1992 | Kopec et al. | |
| 5,171,048 A | 12/1992 | Weinerman et al. | |
| 5,434,487 A | 7/1995 | Long et al. | |
| 5,517,719 A | 5/1996 | Christ | |
| 5,549,348 A | 8/1996 | Posa | |
| 5,746,459 A | 5/1998 | Giroux, Jr. et al. | |
| 5,862,692 A | 1/1999 | Legault et al. | |
| 6,305,727 B1 | 10/2001 | Bland | |
| 6,317,922 B1 | 11/2001 | Kondratuk | |
| 6,540,270 B1 | 4/2003 | Reddmann | |
| 6,553,638 B1 | 4/2003 | Kohlstrand et al. | |
| 6,557,209 B1 | 5/2003 | Wood et al. | |
| 6,685,239 B2 | 2/2004 | Yamauchi et al. | |
| 6,733,066 B1 | 5/2004 | Valdez | |
| 6,758,012 B2 | 7/2004 | Shimizu | |
| 6,866,328 B1 | 3/2005 | Mustybrook | |
| 6,955,389 B2 | 10/2005 | Suzuki et al. | |

(Continued)

FOREIGN PATENT DOCUMENTS

DE    202006012387    * 12/2006

(Continued)

OTHER PUBLICATIONS

SAE Technical Paper Series, 1999-01-1851, "Percentile Frequency Method for Evaluating Impulsive Sounds" by Richard J. Fridrich.
SAE Technical Paper Series, 2004-01-0161, "A Comprehensive Study of Door Slam" by R. Mohan Iyengar, et al.

*Primary Examiner* — Khoi Tran
*Assistant Examiner* — Spencer Patton
(74) *Attorney, Agent, or Firm* — Price Heneveld LLP

(57) ABSTRACT

An apparatus for vehicle door deflection and movement control. The apparatus includes a primary electromagnetic device disposed generally in a vehicle door frame or generally in an area of a vehicle body adjacent the vehicle door frame, and a controller for activating the primary electromagnetic device to push or pull the vehicle door frame. The apparatus may further include a sensor for measuring vehicle door deflection during vehicle movement. The controller may activate the primary electromagnetic device based on deflection measurements by the sensor to pull the vehicle door frame to generally cancel the vehicle door deflection.

18 Claims, 14 Drawing Sheets

U.S. PATENT DOCUMENTS

| | | |
|---|---|---|
| 7,026,897 B2 | 4/2006 | Lamb et al. |
| 2002/0112526 A1* | 8/2002 | Mattes .................. 73/12.09 |
| 2005/0082870 A1 | 4/2005 | Chikata et al. |
| 2005/0198774 A1* | 9/2005 | Henry et al. .................. 16/71 |
| 2008/0023261 A1* | 1/2008 | Kaneko et al. ............... 181/204 |

FOREIGN PATENT DOCUMENTS

| | | |
|---|---|---|
| DE | 202006012387 U1 | 12/2006 |
| JP | 2006007807 * | 1/2006 |
| WO | WO 2005111993 A1 * | 11/2005 |

* cited by examiner

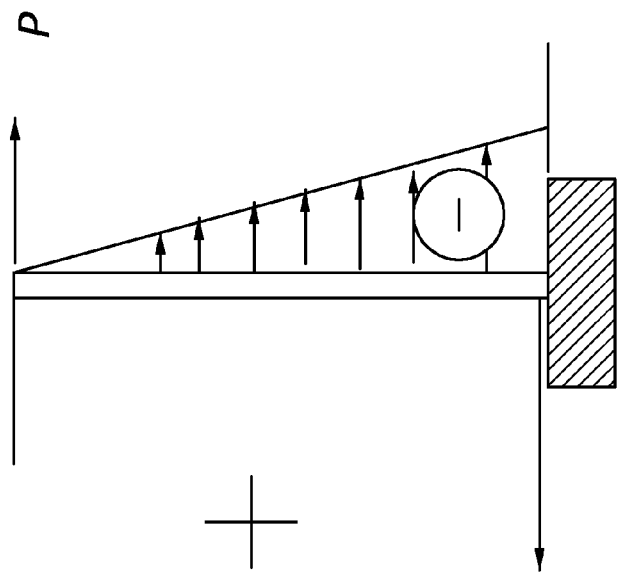
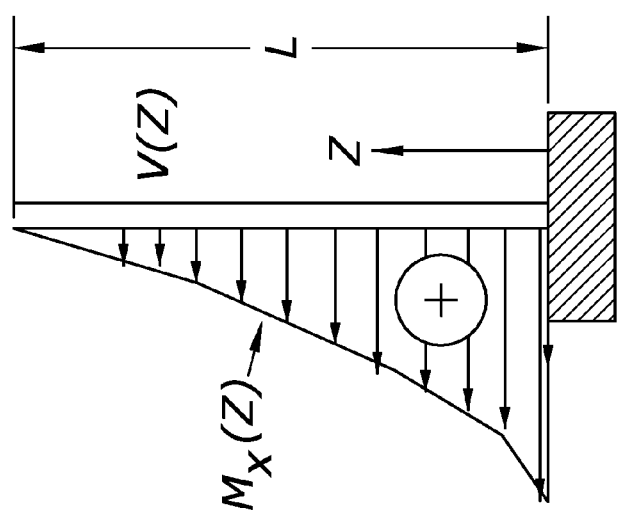
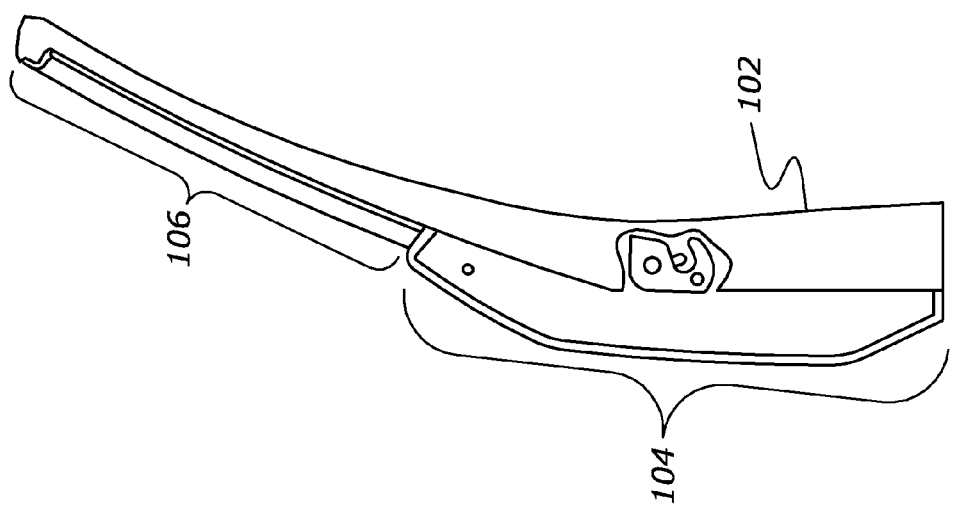
Fig. 2B
Fig. 2A

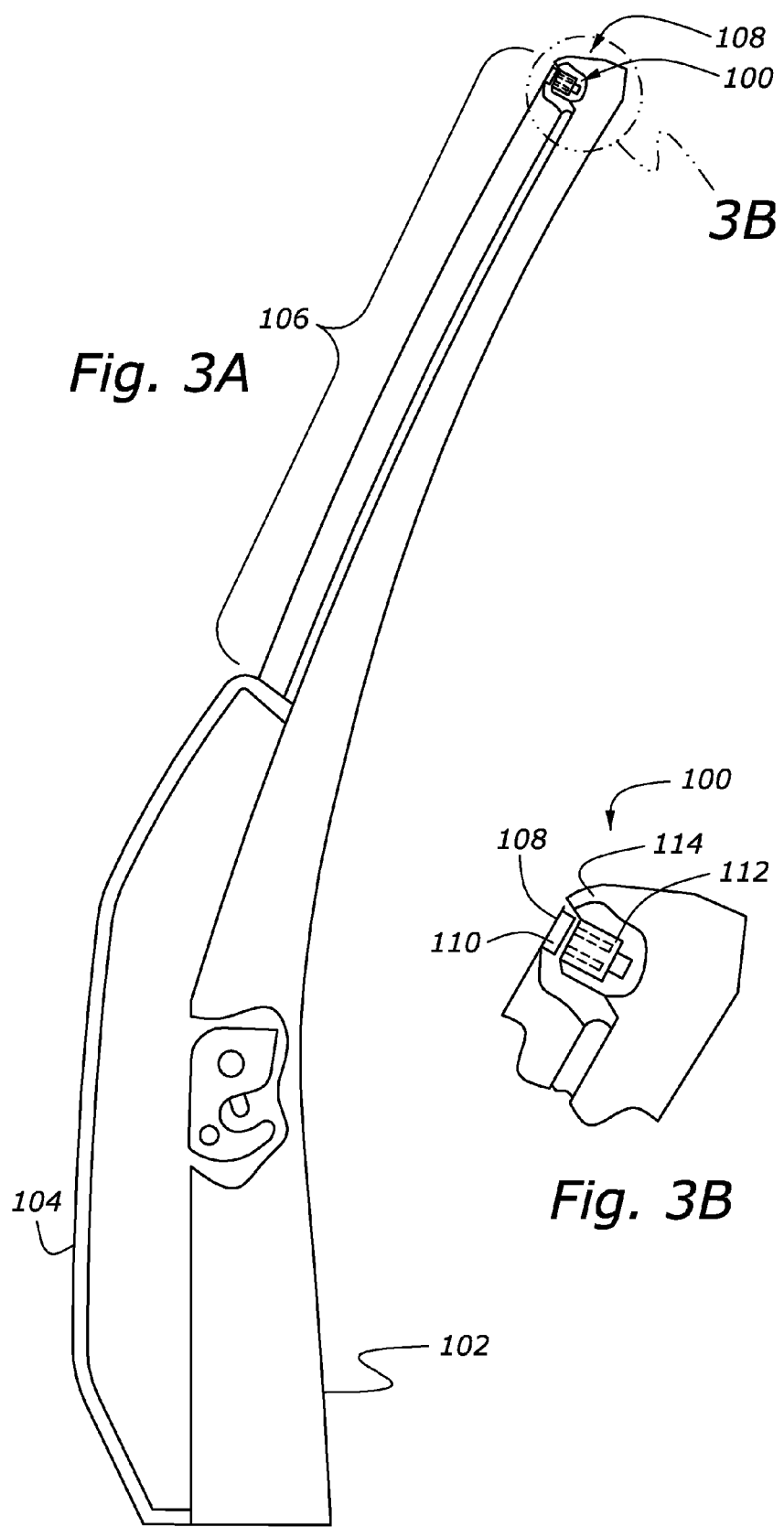

VEHICLE DOOR ACTIVE AND PASSIVE CONTROL DEVICE

BACKGROUND OF INVENTION a. Field of Invention

The invention relates generally to vehicle structural design and related structural deflection control, and, more particularly, to an apparatus and method for actively and passively controlling deflection and for assisting with opening and closing of a vehicle door.

b. Description of Related Art

In the automobile art, wind noise is an important consideration both from an aesthetics and vehicle dynamics standpoint. For components such as vehicle doors, dynamic door deflection under wind noise is one of the major design concerns for customer satisfaction for wind noise sound perception. Over the years, a variety of methods, such as increasing door stiffness or reinforcing of the door frame, have been employed to minimize dynamic door deflection. These methods invariably increase the cost and/or weight of a vehicle, and can further complicate the manufacturing and assembly processes. Yet further, in conjunction with designing a door frame for minimizing dynamic door deflection, such design considerations also impact the door opening and closing effort. As with customer satisfaction based on wind noise sound perception, the opening and closing effort for a door likewise impacts customer satisfaction with regard to the routine operation of a vehicle.

It is therefore desirable to have a vehicle including a door frame design with minimal dynamic door deflection, and with reduced door opening and closing effort.

An exemplary vehicle door and frame design for minimizing dynamic door deflection and/or for improving door opening/closing effort is disclosed for example in U.S. Pat. No. 4,579,192 to Mueller.

Referring to FIGS. 4 and 5 of Mueller, Mueller provides a method and apparatus for sealing a closure gap for an automobile door (21) having elastic and inflatable packing members (14) which are pressurized to control the door seal gap when the speed of the vehicle exceeds a set value. Pressuring and control device (4) allows inflation of members (14) based on the readings provided by pressure sensor (10) and speed sensor (11) for providing a good seal around the door, yet permitting easy opening of the door upon depressurization.

While the Mueller device limits movement of the door, the device however does not facilitate the door opening and closing effort, and requires significant structural design effort for implementation of the inflatable packing members (14).

Accordingly, there remains a need for an apparatus and method for minimizing dynamic door deflection and/or for improving door opening/closing effort, which is economical to manufacture, install and service in existing and new vehicles. There also remains a need for an apparatus and method for minimizing dynamic door deflection and/or for improving door opening/closing effort which is robust in design for long term use in a variety of vehicles, which reduces design and tooling costs, and which further meets automotive fit and operation requirements for such components.

SUMMARY OF INVENTION

The invention solves the problems and overcomes the drawbacks and deficiencies of prior art vehicle door deflection control and opening/closing assist devices by providing an apparatus for vehicle door deflection and movement control. The apparatus may include one or more primary electromagnetic devices disposed generally in or on a vehicle door frame or generally in or on an area of a vehicle body adjacent the vehicle door frame, and a controller for activating the primary electromagnetic device to push or pull the vehicle door frame.

For the apparatus described above, the apparatus may include one or more bumpers disposed adjacent the primary electromagnetic device for providing a contact surface during pushing or pulling of the vehicle door frame. In a particular embodiment, the bumper may be a magnetic bumper. The apparatus may include one or more secondary electromagnetic devices disposed adjacent the primary electromagnetic device for providing a contact surface during pushing or pulling of the vehicle door frame. The apparatus may include a strain gauge (or a sensor) for measuring vehicle door deflection during vehicle movement, with the controller activating the primary electromagnetic device based on deflection measurements by the strain gauge to pull the vehicle door frame to generally cancel the vehicle door deflection. The apparatus may include a sensor for detecting movement of a door handle, with the controller activating the primary electromagnetic device based on detected movement of the door handle to push or pull the vehicle door frame to respectively assist with opening or closing of a vehicle door. The controller may activate the primary electromagnetic device upon vehicle movement greater than a predetermined speed. Further, the controller may activate the primary electromagnetic device upon detection of the vehicle drive position, air bag deployment, and/or vehicle on/off condition.

The invention also provides an apparatus for vehicle movable component deflection and movement control. The apparatus may include one or more primary electromagnetic devices disposed generally in or on a vehicle movable component or generally in or on an area of a vehicle body adjacent the vehicle movable component, and a controller for activating the primary electromagnetic device to push or pull the vehicle movable component.

For the apparatus described above, the apparatus may further include one or more bumpers disposed adjacent the primary electromagnetic device for providing a contact surface during pushing or pulling of the vehicle movable component. In a particular embodiment, the bumper may be a magnetic bumper. The apparatus may also include one or more secondary electromagnetic devices disposed adjacent the primary electromagnetic device for providing a contact surface during pushing or pulling of the vehicle movable component. The apparatus may include a strain gauge (or a sensor) for measuring vehicle movable component deflection during vehicle movement, with the controller activating the primary electromagnetic device based on deflection measurements by the strain gauge to pull the vehicle movable component to generally cancel the vehicle movable component deflection. The apparatus may include a sensor for detecting movement of a handle for opening the vehicle movable component, with the controller activating the primary electromagnetic device based on detected movement of the handle to push or pull the vehicle movable component to respectively assist with opening or closing of the vehicle movable component. Further, the controller may activate the primary electromagnetic device upon vehicle movement greater than a predetermined speed. The controller may also activate the primary electromagnetic device upon detection of vehicle drive position, air bag deployment, and/or vehicle on/off condition.

Additional features, advantages, and embodiments of the invention may be set forth or apparent from consideration of the following detailed description, drawings, and claims.

Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings:

FIG. 2A is another side view of the automobile door of FIG. 1A, for reference in FIG. 2B;

FIG. 2B is a cantilever beam model for deflection of the automobile door of FIG. 2A, illustrating an exemplary method for cancelling door deflection;

FIG. 3A is a side view of the automobile door of FIG. 1A, illustrating an apparatus for door deflection control according to the present invention, mounted along a door upper tip;

FIG. 3B is an enlarged view of the apparatus for door deflection control of FIG. 3A;

DETAILED DESCRIPTION OF THE PREFERRED EMBODIMENTS

Figure 1B:
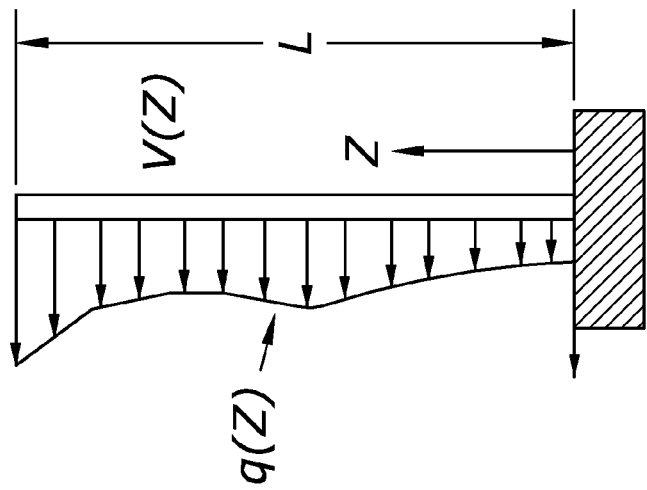
FIG. 1B is a cantilever beam model for deflection of the exemplary automobile door of FIG. 1A.

Referring now to the drawings wherein like reference numerals designate corresponding parts throughout the several views, FIGS. 1A-11 illustrate an apparatus for door deflection control and door open/close assist according to the present invention, generally designated "door movement control apparatus 100."

Figure 1A:
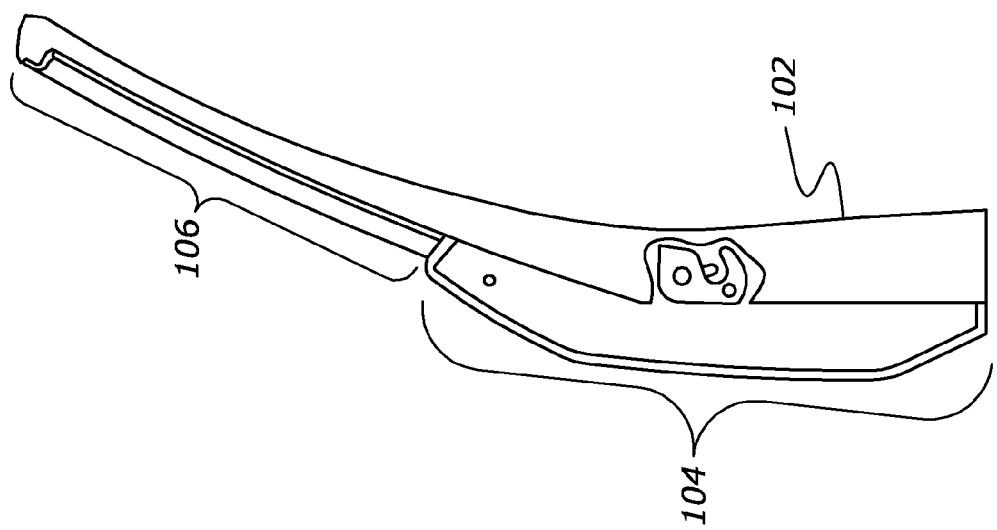
FIG. 1A is an exemplary side view of an automobile door.

Referring to FIGS. 1A and 1B, the present invention is based on the theory of reducing a moment $M_x(z)$ by an electromagnetic device in a passive/active manner. For a typical automobile door 102 as illustrated in FIG. 1A, door 102 may include a door lower frame 104 and upper window frame area 106. Door 102 may further include door deflection defined by the equation:

$$\frac{d^2 v(z)}{dz^2} = \frac{M_x(z)}{EI_x(z)},$$

where $v(z)$ is the door deflection at z, $M_x(z)$ is the bending moment about the z-axis at z, E is the Young's Modulus, and $I_x(z)$ is the moment of inertia about the x-axis at z.

Referring to FIGS. 2A and 2B, in order to cancel deflection of upper window frame area 106, a dynamic load P applied to upper window frame area 106 may reduce the moment $M_x(z)$ in such a way that almost no deflection occurs of upper window frame area 106 at some point of interest.

Figures 4A, 4B:
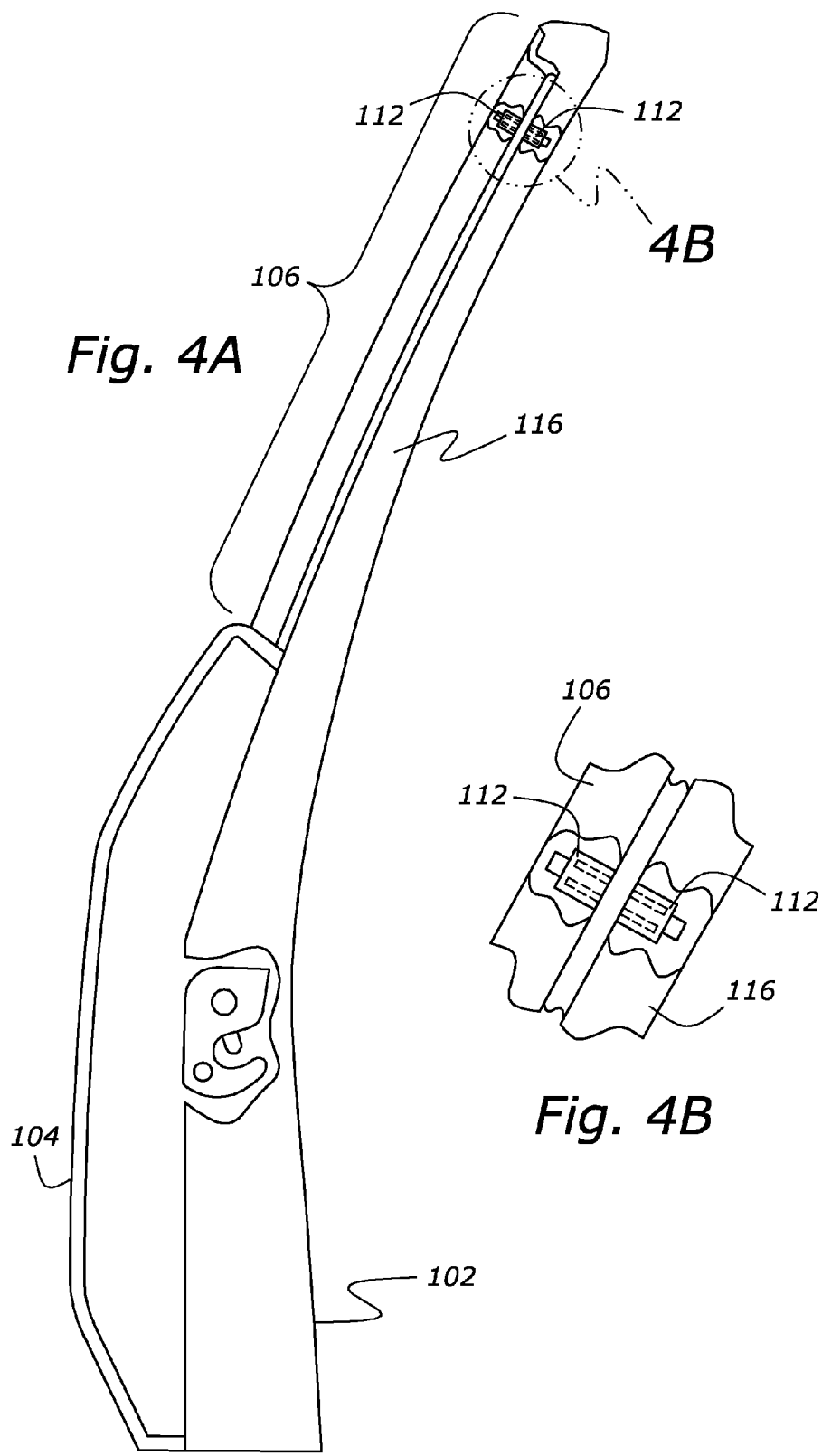
FIG. 4A is a side view of the automobile door of FIG. 1A, illustrating an apparatus for door deflection control according to the present invention, mounted adjacent an A or B-pillar area.
FIG. 4B is an enlarged view of the apparatus for door deflection control of FIG. 4A.

Referring to FIGS. 3A and 3B, in order to implement the aforementioned theoretical characteristics of door 102, the present invention provides door movement control apparatus 100 which may be located adjacent upper tip 108 of door 102. In the embodiment of FIGS. 3A and 3B, door movement control apparatus 100 may include a rubber magnetic bumper 110 and a lifting electromagnet 112. In an exemplary embodiment, lifting electromagnet 112 may be an EM-137 electromagnetic solenoid device produced by A.P. W. Company Inc., and include the following specifications: 44 lb holding force, 12 VDC, 5 W, 0.81"(L)×1.37"(Dia.), 0.25 lb. Further, in an exemplary embodiment, rubber magnetic bumper 110 may include a 0.5 mm thickness. As shown, rubber magnetic bumper 110 may be disposed along upper tip 108 and lifting electromagnet 112 may be disposed along roof rail 114. Rubber magnetic bumper 110 and lifting electromagnet 112 may also be disposed along the door A or B-pillars, and a variety of other locations, as would be readily evident to those skilled in the art in view of this disclosure. Alternatively, as shown in FIGS. 4A and 4B, lifting electromagnets 112 may be placed on door window frame area 106 and adjacently along the door A-pillar 116.

Figure 5:
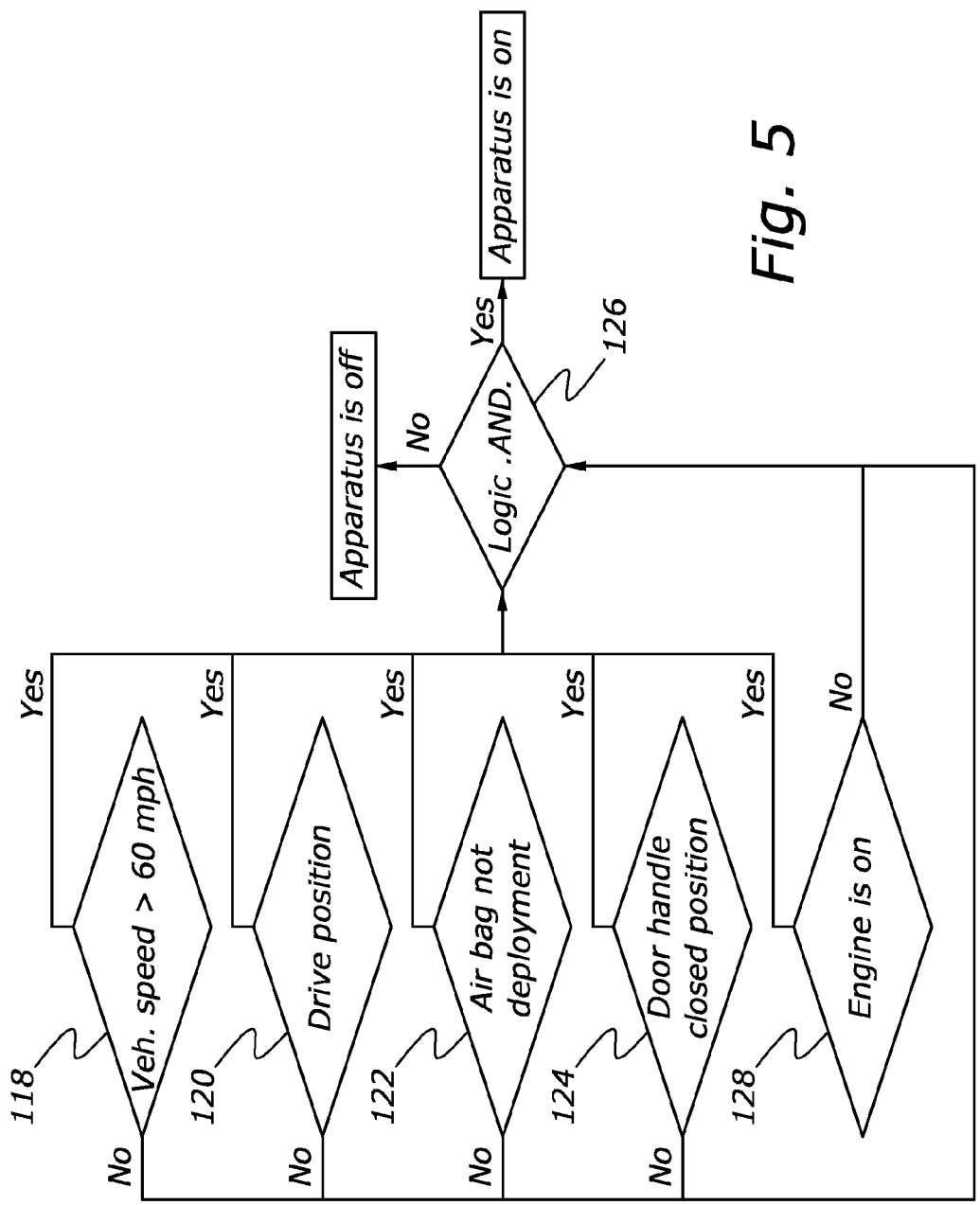
FIG. 5 is a door deflection control function flow chart.

In operation, referring to FIG. 5, door movement control apparatus 100 may operate based on the exemplary door deflection control flow chart of FIG. 5. Specifically, at locations 118 (vehicle speed in excess of 60 mph), 120 (drive position), 122 (air bag not deployed) and 124 (door handle closed position), apparatus 100 may be initially turned off via logic control 126. At location 128, when the engine (not shown) is turned on and any of the conditions specified at locations 118, 120, 122 and 124 are met, apparatus 100 may be turned on via logic control 126.

The operation of door movement control apparatus 100 will now be described in detail with reference to FIGS. 6A-8D, when apparatus 100 is turned on via logic control 126.

Figure 6A:
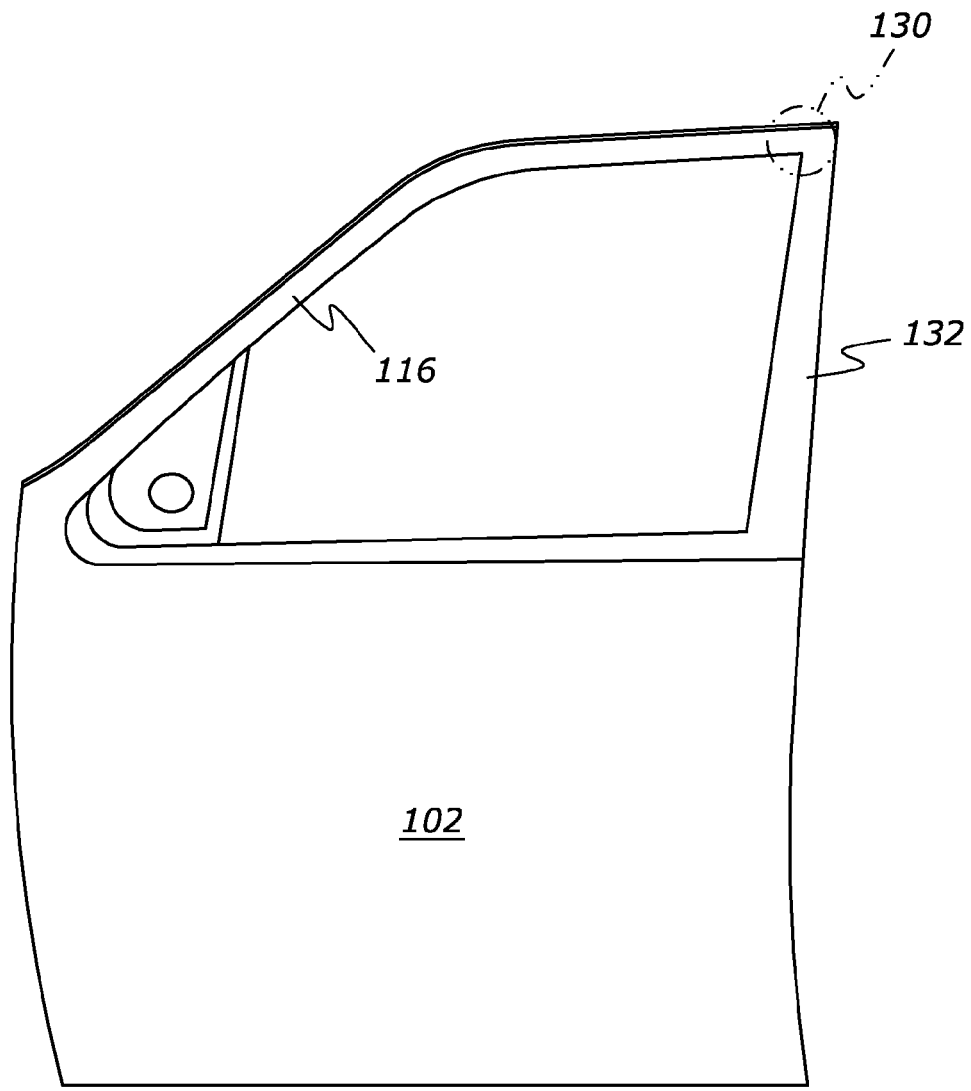
FIG. 6A is an exemplary front view of an automobile door, illustrating an apparatus for door deflection control mounted adjacent a door upper tip/B-pillar area.
Figure 6B:
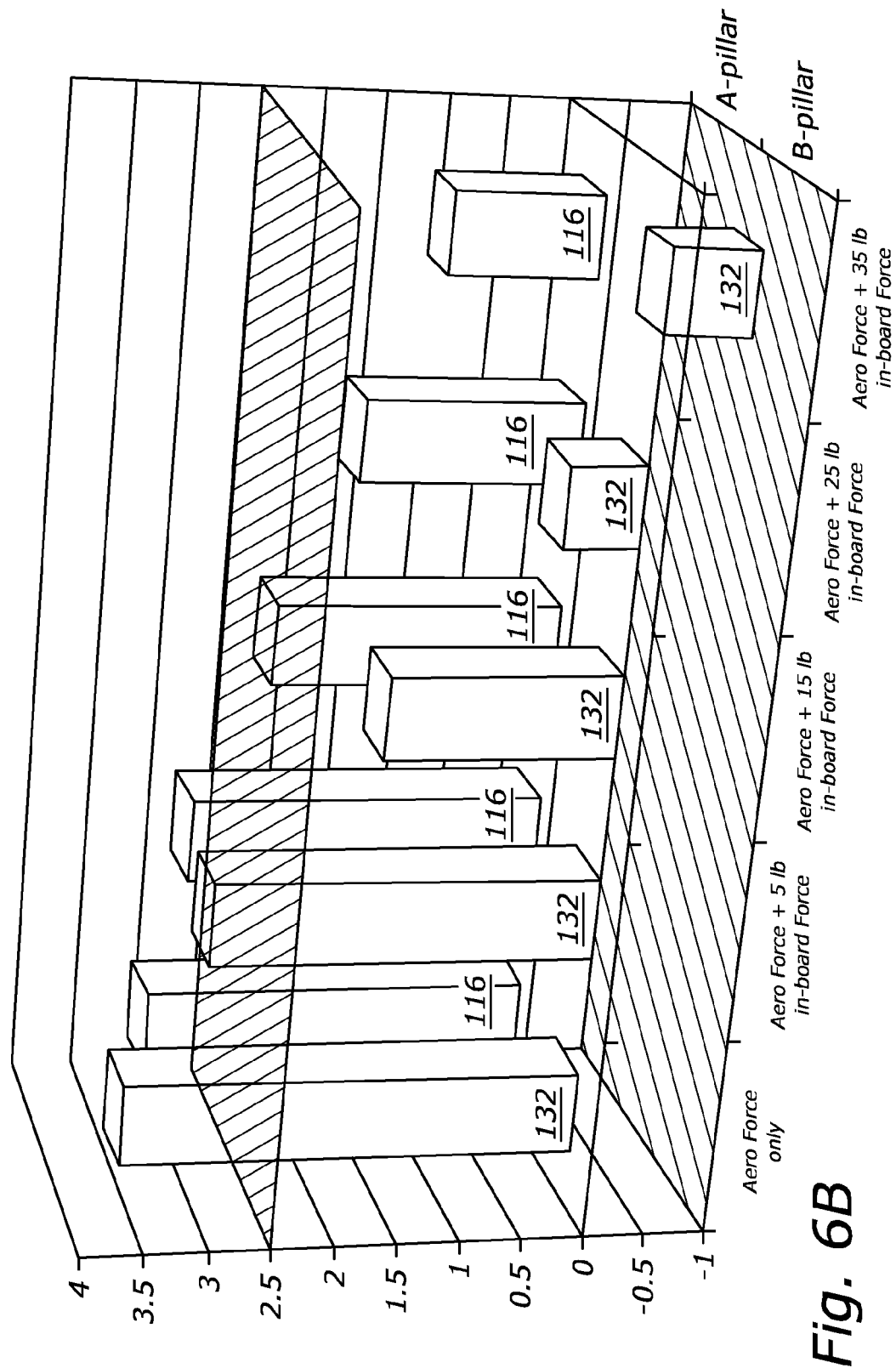
FIG. 6B is a graph illustrating dynamic door deflection based on mounting of the door deflection control apparatus at the FIG. 6A location.

Referring to FIGS. 6A and 6B, with door movement control apparatus 100 mounted adjacent area 130 of door 102, FIG. 6B illustrates door deflection measured at the A and B-pillars, respectively at 116, 132. As shown in FIG. 6B, without activation of door movement control apparatus 100, the A and B pillars deflect approximately 3.0 and 3.5 mm, respectively, due to suctioning pressure from air during vehicle movement at approximately 100 mph. Upon the application of a 15 lb in-board (i.e. pulling) force by apparatus 100, deflection at the A and B pillars is respectively reduced further. As also shown in FIG. 6B, application of higher in-board forces, such as 25 lb or 35 lb, her reduce the deflection of door 102, with the B-pillar deflection reduced to approximately 0 mm.

Figure 7A:
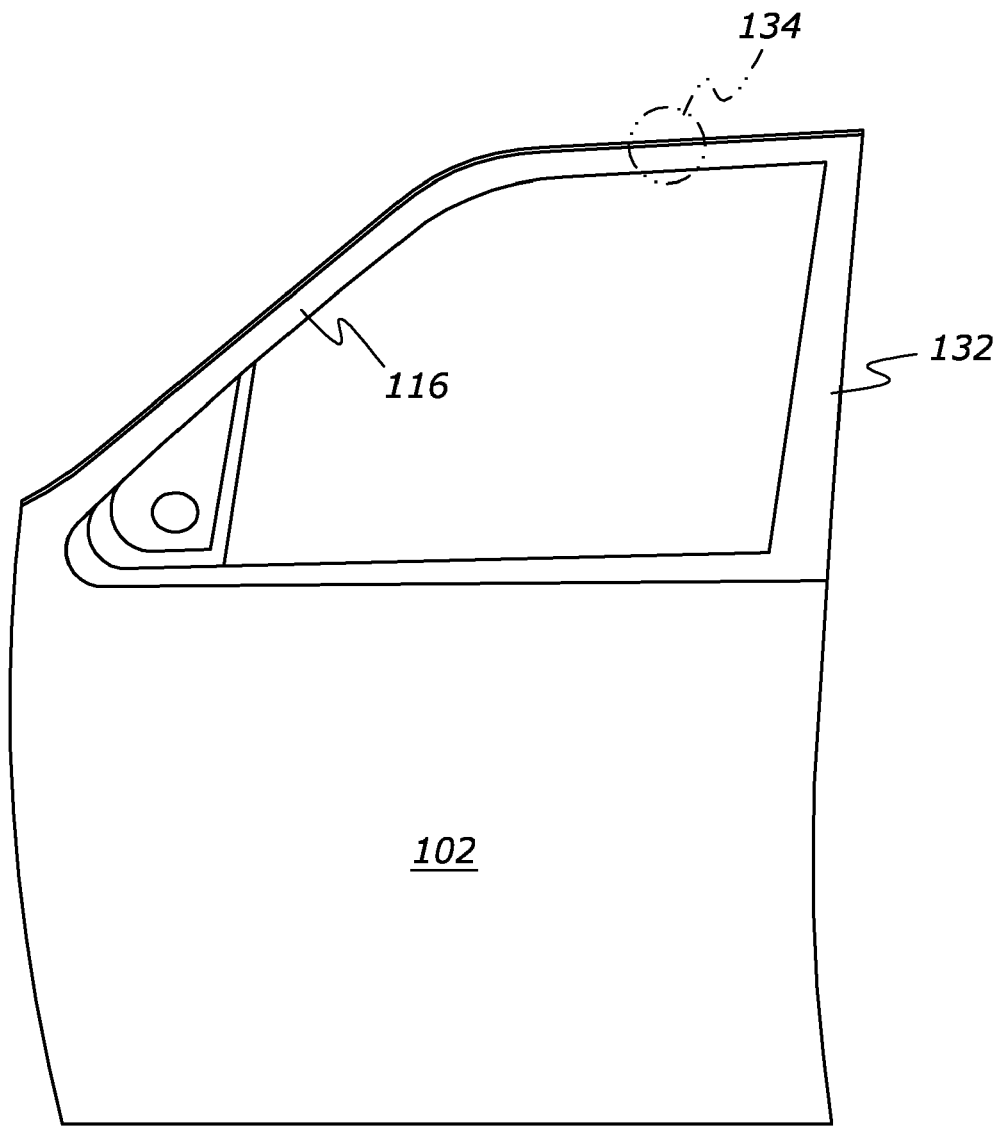
FIG. 7A is an exemplary front view of an automobile door, illustrating an apparatus for door deflection control mounted adjacent a door upper tip area.
Figure 7B:
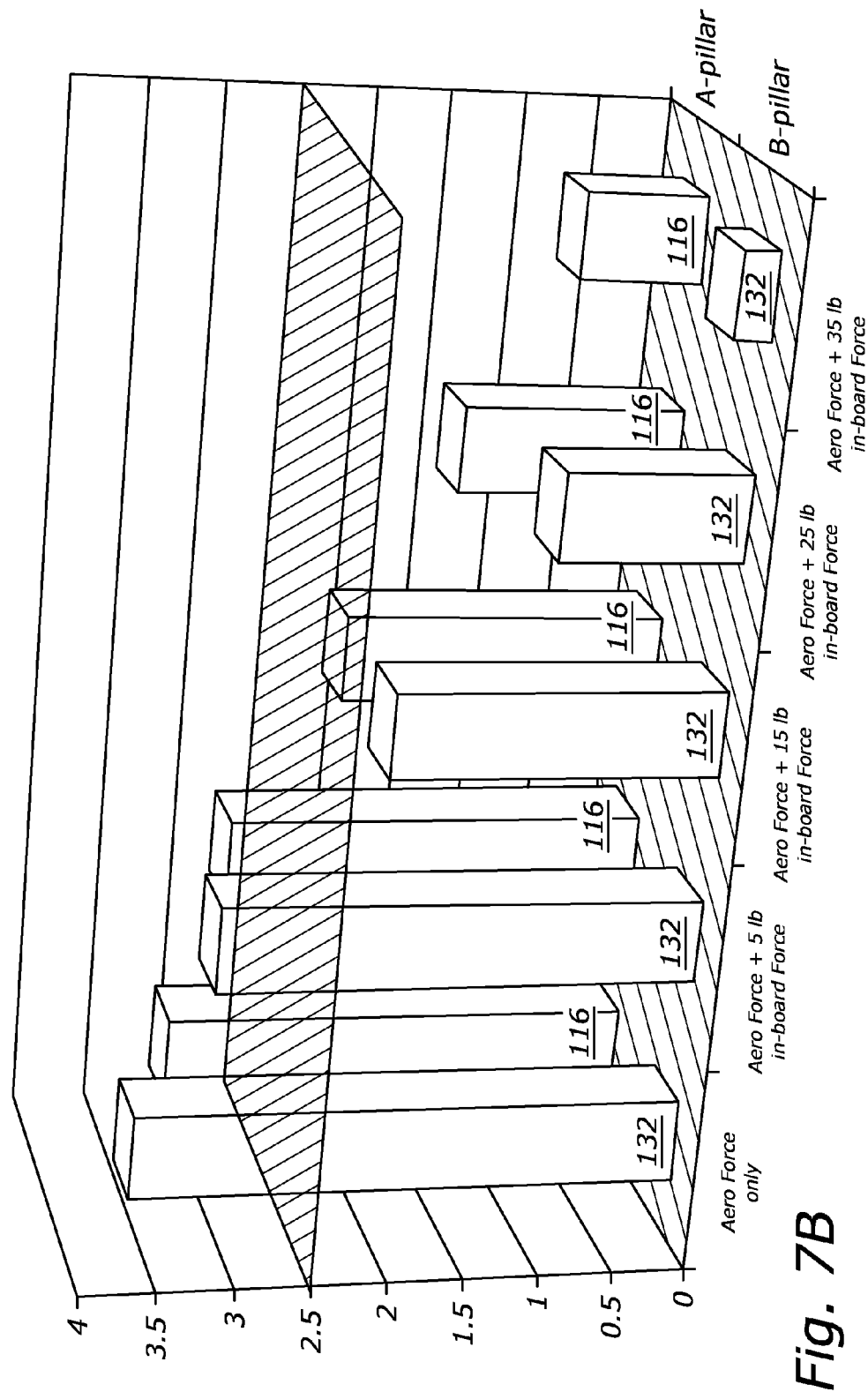
FIG. 7B is a graph illustrating dynamic door deflection based on mounting of the door deflection control apparatus at the FIG. 7A location.

Referring to FIGS. 7A and 7B, with door movement control apparatus 100 mounted adjacent area 134 of door 102, FIG. 7B illustrates door deflection measured at the A and B-pillars, respectively at 116, 132. As shown in FIG. 7B, without activation of door movement control apparatus 100, the A and B pillars deflect approximately 3.0 and 3.5 mm, respectively, due to suctioning pressure from air during vehicle movement at approximately 100 mph. Upon the application of a 15 lb in-board force by apparatus 100, deflection at the A and B pillars is respectively reduced further. As also shown in FIG. 7B, application of higher in-board forces, such as 25 lb or 35 lb, further reduce the deflection of door 102, with the B-pillar deflection reduced to approximately 0 mm.

Figure 8A:
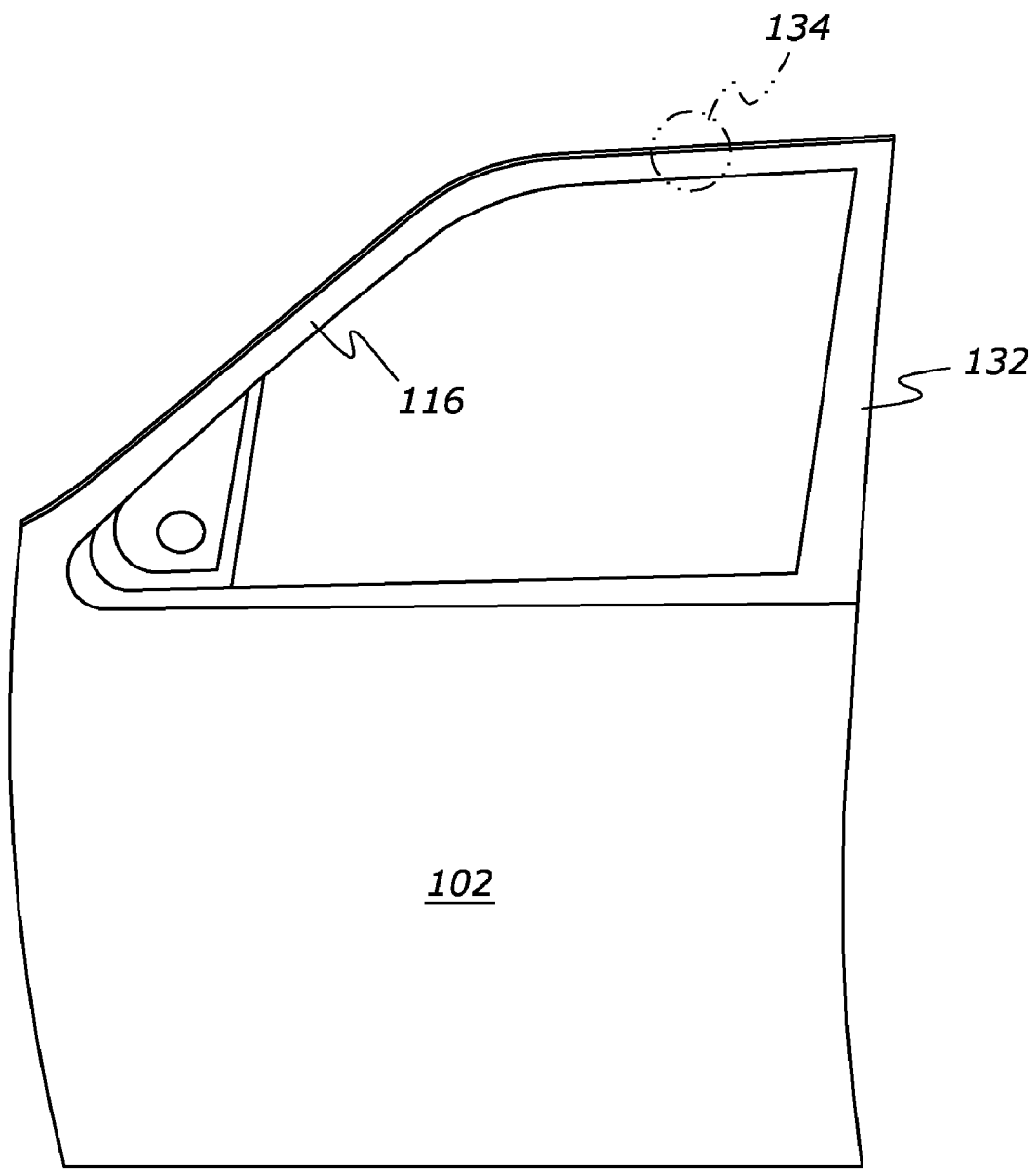
FIG. 8A is an exemplary front view of an automobile door, illustrating an apparatus for door deflection control mounted adjacent a door upper tip area, with the door including reinforcement.
Figure 8B:
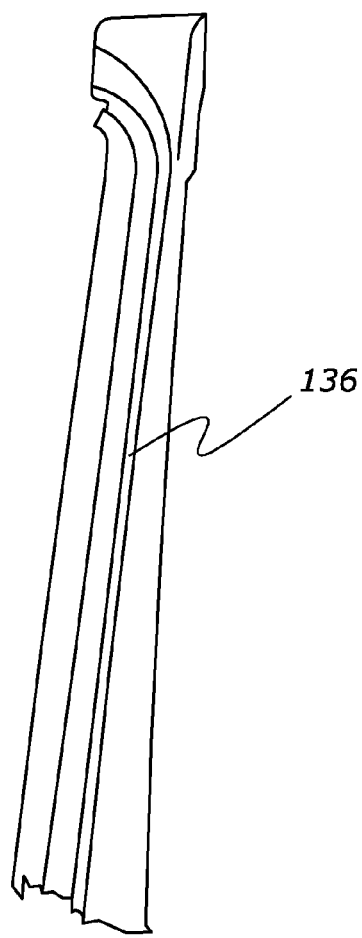
FIGS. 8B and 8C are views illustrating the reinforcement of FIG. 5A.
Figure 8C:
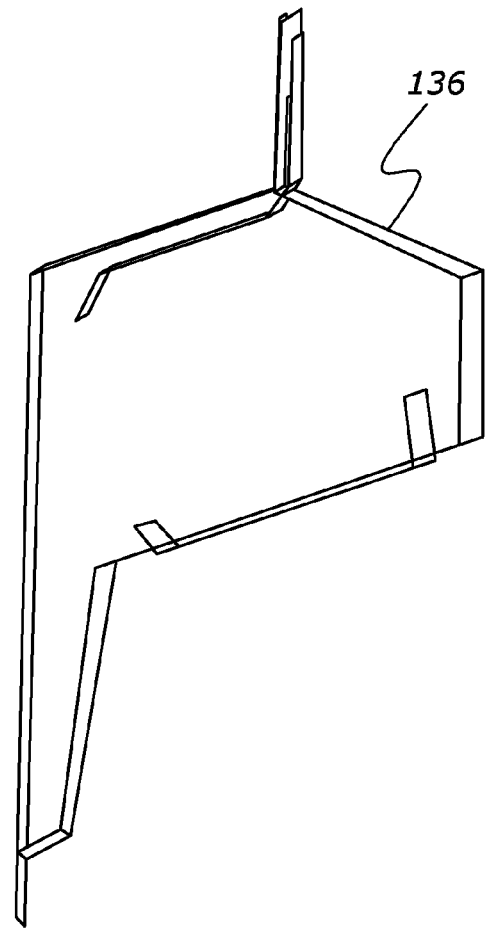
Figure 8D:
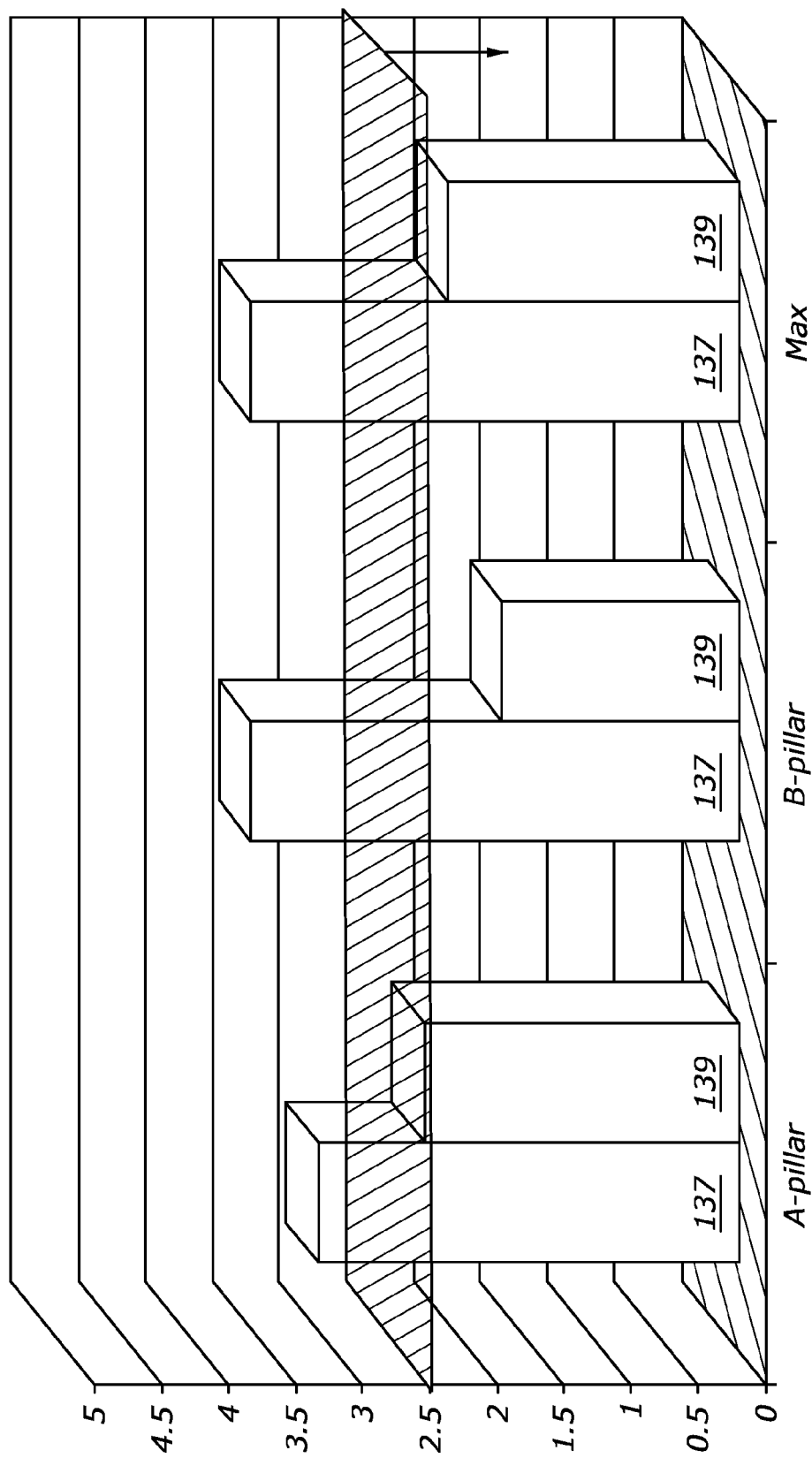
FIG. 8D is a graph illustrating dynamic door deflection based on mounting of the door deflection control apparatus at the FIG. 5A location.

Lastly, referring to FIGS. 8A-8D, with door movement control apparatus 100 mounted adjacent area 134 of door 102 as in FIG. 7A, as shown in FIGS. 8B and 8C, door 102 may include a reinforcement device 136 (often referred to as a "pork-chop") for reinforcing B-Pillar 132 for improved dynamic door deflection. FIG. 8B illustrates door deflection measured at the A and B-pillars, respectively at 116, 132. As shown in FIG. 8B at 137, without activation of door movement control apparatus 100, the A and B pillars deflect greater than 2.5 mm (i.e. approximately 3.0 and 3.5 mm), even with the addition of device 136. With the use of door movement control apparatus 100, but without device 136, as shown in FIG. 8B at 139, the deflection at the A and B pillars is respectively reduced below the 2.5 mm deflection threshold required by preset system design specifications for door deflection. Thus with the use of apparatus 100, reinforcement device 136 can be eliminated, thus resulting in a significant weight reduction of at least 0.8 lb/door.

Figure 9:
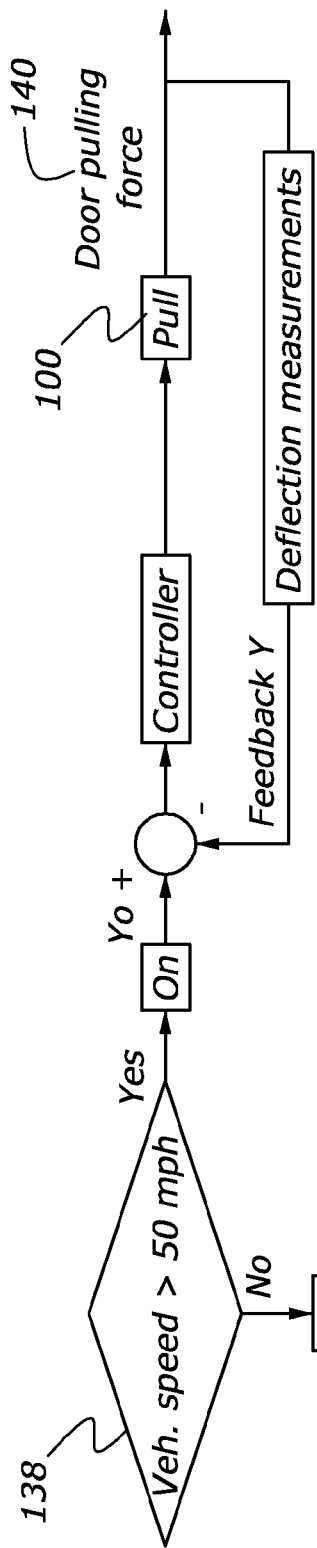
FIG. 9 is a logic diagram for dynamic door deflection control.

Referring next to the logic diagram of FIG. 9, in order to provide for active control of door deflection (i.e. when the vehicle is moving), at location 138, the speed of the vehicle may be checked such that if the speed of the vehicle is greater than a predetermined speed, i.e. approximately 50 mph, door movement control apparatus 100 may be turned on, and otherwise remain off. Once apparatus 100 is turned on, an active feedback control scheme may be employed to control apparatus 100 based on deflection measurement performed via a strain gauge (not shown) or another such device, whereby the controller determines the output currents for apparatus 100 for performing the required door deflection control. The resulting door pulling force at 140 may thus be used to counteract deflection of door 102 measured by the strain gauge.

Figure 10:
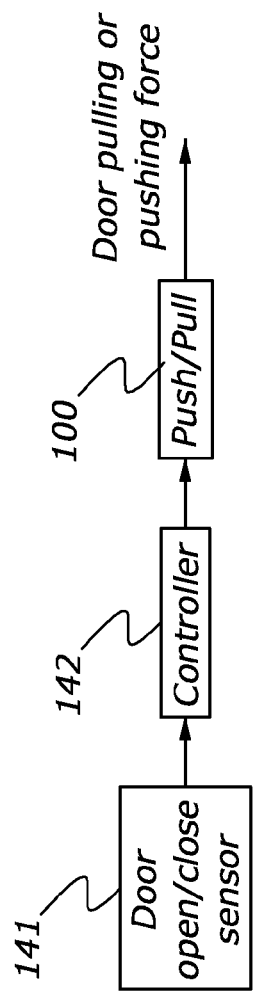
FIG. 10 is logic diagram for door open/close assist.

Referring to the logic diagram of FIG. 10, door movement control apparatus 100 may also be used for assisting with the opening/closing of door 102, and/or for the prevention of inadvertent door opening. In this regard, a door open/close sensor 141 (not shown) may be employed or an existing sensor may be used to determine the open/close status of the door. Based on the results, a controller 142 may be used to activate apparatus 100 in a push/pull manner, whereby during the opening or closing of door 102, apparatus 100 may likewise assist by providing a pushing/pulling force. In order to prevent inadvertent door opening, apparatus 100 may be used in the opposite manner of its opening/closing assist function, whereby apparatus 100 may be used to pull door 102, for example, during vehicle movement to prevent opening thereof (or at least increase the force required to inadvertently open the door), or may be used as a child-safety feature to likewise prevent (or at least increase the force required to inadvertently open the door) inadvertent opening.

Figure 11:
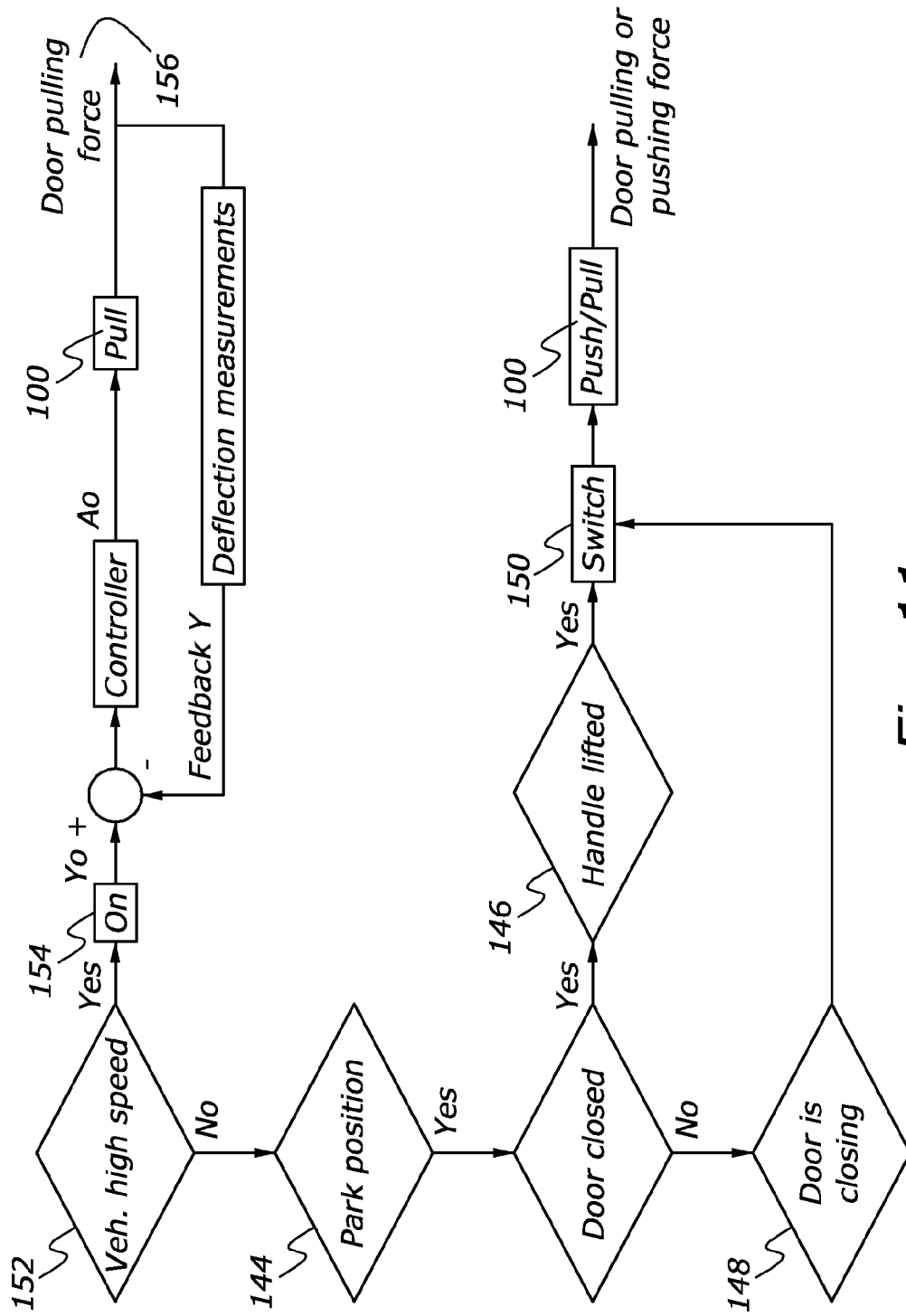
FIG. 11 is a logic diagram for dynamic door deflection control, and door open/close assist.

Referring next to the logic diagram of FIG. 11, based on the discussion above with reference to FIGS. 9 and 10, door movement control apparatus 100 may be used for assisting with the opening/closing of door 102, as well as for active control of door deflection (i.e. when the vehicle is moving). Specifically, with the vehicle parked at position 144, if the outside or inside handles (not shown) are lifted/actuated at position 146 (with the lifting/actuation being detected by sensors or switches (not shown)), apparatus 100 may be activated to push door 102 and thus assist with the opening thereof. During closing of door 102 at position 148, the operation of door 102 may be switched at 150 such that apparatus 100 is activated to pull door 102 and thus assist with the closing thereof. With the vehicle at a high speed condition at position 152 (i.e. moving greater than 60 mph), the controller for apparatus 100 may be activated at position 154, whereby an active feedback control scheme (as discussed above with reference to FIG. 9) may be employed to control apparatus 100 based on deflection measurement performed via a strain gauge (not shown) or another such device. The resulting door pulling force at 156 may thus be used to counteract any deflection of door 102.

To summarize, door movement control apparatus 100 allows for dynamic reduction and control of door deflection and further allows for assist with the door opening/closing effort. Apparatus 100 is also readily adaptable for use with existing or new automobiles, with minimal design effort or modification of existing door structures.

Those skilled in the art would readily appreciate in view of this disclosure that various modifications could be made to the aforementioned components, without departing from the scope of the present invention. For example, whereas apparatus 100 has been described for use in conjunction with door 102, apparatus 100 may be readily usable with other movable components, such as the vehicle hood or tailgate, as well as with other body components susceptible to wind or movement related deflection. Whereas door movement control apparatus 100 has been illustrated as being installed adjacent upper tip 108 in the FIGS. 3A-4B embodiments, apparatus 100 may be installed as needed along the door A, B or C-pillars. Yet further, whereas a specific example of lifting electromagnet 112 has been indicated as an EM-137 electromagnetic solenoid device produced by ASP. W. Company Inc., electromagnet 112 may be another mechanical, piezoelectric or similar device. Moreover, whereas lifting electromagnet 112 has been illustrated in as being a circular device, electromagnet 112 may be used in a strip or another form, based on design constraints such as the specific area of a door.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. An apparatus for vehicle door deflection and movement control comprising:
at least one primary electromagnetic device disposed in or on a vehicle door frame or an area of a vehicle body adjacent the vehicle door frame;
a deflection sensor measuring vehicle door deflection due to air during vehicle movement; and a controller activating said primary electromagnetic device based on the measured vehicle door deflection received through an active feedback control scheme to pull the vehicle door frame to generally cancel the vehicle door deflection.

2. An apparatus according to claim 1, further comprising at least one bumper disposed adjacent said primary electromagnetic device for providing a contact surface during said pulling of the vehicle door frame.

3. An apparatus according to claim 2, wherein said bumper is a magnetic bumper.

4. An apparatus according to claim 1, further comprising at least one secondary electromagnetic device disposed adjacent said primary electromagnetic device for providing a contact surface during said pulling of the vehicle door frame.

5. An apparatus according to claim 1, wherein the deflection sensor comprises a strain gauge.

6. An apparatus according to claim 1, further comprising a door handle sensor for detecting movement of a door handle, said controller activating said primary electromagnetic device based on the detected movement of the door handle to push the vehicle door frame to assist with opening of the vehicle door.

7. An apparatus according to claim 1, wherein said controller activates said primary electromagnetic device upon vehicle movement greater than a predetermined speed.

8. An apparatus according to claim 1, wherein said controller activates said primary electromagnetic device upon detection of at least one of vehicle drive position, air bag deployment, and vehicle on/off condition.

9. An apparatus for vehicle movable component deflection and movement control comprising:
- at least one primary electromagnetic device disposed in or on a vehicle movable component or an area of a vehicle body adjacent the vehicle movable component;
- a sensor measuring vehicle component deflection due to air during vehicle movement; and
- a controller activating said primary electromagnetic device based on the measured vehicle component deflection received through an active feedback control scheme to pull the vehicle movable component to generally cancel the vehicle component deflection.

10. An apparatus according to claim 9, further comprising at least one bumper disposed adjacent said primary electromagnetic device for providing a contact surface during said pulling of the vehicle movable component.

11. An apparatus according to claim 10, wherein said bumper is a magnetic bumper.

12. An apparatus according to claim 9, further comprising at least one secondary electromagnetic device disposed adjacent said primary electromagnetic device for providing a contact surface during said pulling of the vehicle movable component.

13. An apparatus according to claim 9, wherein the sensor comprises a strain gauge.

14. An apparatus according to claim 9, further comprising a handle sensor for detecting movement of a handle for opening the vehicle movable component, said controller activating said primary electromagnetic device based on the detected movement of the handle to push the vehicle movable component to assist with opening of the vehicle movable component.

15. An apparatus according to claim 9, wherein said controller activates said primary electromagnetic device upon vehicle movement greater than a predetermined speed.

16. An apparatus according to claim 9, wherein said controller activates said primary electromagnetic device upon detection of at least one of vehicle drive position, air bag deployment, and vehicle on/off condition.

17. An apparatus for vehicle door deflection and movement control comprising:
- an electromagnetic device disposed in or on a vehicle door frame or body adjacent the vehicle door frame;
- a deflection sensor measuring vehicle door deflection due to air during vehicle movement; and
- a controller activating said electromagnetic device based on the measured vehicle door deflection received through an active feedback control scheme to pull the vehicle door frame to generally cancel the vehicle door deflection.

18. An apparatus for vehicle door deflection and movement control comprising:
- an electromagnetic device disposed in or on a vehicle door frame or body adjacent the vehicle door frame;
- a deflection sensor measuring vehicle door deflection due to air during vehicle movement; and
- a controller activating said electromagnetic device based on the measured vehicle door deflection received through an active feedback control scheme to apply force to the vehicle door frame to generally cancel the vehicle door deflection.

* * * * *